(12) United States Patent
Roberts et al.

(10) Patent No.: US 12,078,153 B2
(45) Date of Patent: Sep. 3, 2024

(54) THERMALLY MANAGED ELECTRIC PROPULSION SYSTEMS

(71) Applicant: CALIFORNIA INSTITUTE OF TECHNOLOGY, Pasadena, CA (US)

(72) Inventors: Scott N Roberts, Altadena, CA (US); Sean W Reilly, Pasadena, CA (US); Robert P Dillon, Costa Mesa, CA (US); Benjamin I Furst, Pasadena, CA (US); Dan M Goebel, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 100 days.

(21) Appl. No.: 17/721,026

(22) Filed: Apr. 14, 2022

(65) Prior Publication Data

US 2023/0003202 A1 Jan. 5, 2023

Related U.S. Application Data

(60) Provisional application No. 63/175,481, filed on Apr. 15, 2021.

(51) Int. Cl.
*F03H 1/00* (2006.01)
*B33Y 80/00* (2015.01)

(52) U.S. Cl.
CPC ......... *F03H 1/0031* (2013.01); *F03H 1/0075* (2013.01); *B33Y 80/00* (2014.12)

(58) Field of Classification Search
None
See application file for complete search history.

(56) References Cited

U.S. PATENT DOCUMENTS

| | | | | |
|---|---|---|---|---|
| 5,581,155 A | * | 12/1996 | Morozov | F03H 1/0075 315/111.41 |
| 11,346,330 B1 | * | 5/2022 | Xu | F03H 1/0075 |
| 2007/0147002 A1 | * | 6/2007 | Otsuki | H01L 23/467 257/E23.099 |

(Continued)

OTHER PUBLICATIONS

Xian "Heat Transfer Characteristics of Oscillating Heat Pipe With Water and Ethanol as Working Fluids" (Year: 2010).*

(Continued)

*Primary Examiner* — Arun Goyal
*Assistant Examiner* — William L Breazeal
(74) *Attorney, Agent, or Firm* — Steinfl + Bruno LLP

(57) ABSTRACT

Systems and methods for embedding a thermal management system in an electric propulsion (EP) system is presented. According to one aspect, one or more oscillating heat pipes (OHPs) are provided within functional elements of the EP system. Each OHP includes channel segments that include a sealed working fluid. The channel segments are joined to form a continuous serpentine channel with a channel path that alternates between hot and cold regions of the EP system. According to another aspect, the functional elements of the EP system are reduced to a single monolithic structure with an embedded OHP. The single monolithic structure may be a single material or a multi material. According to yet another aspect, the functional elements are elements of a magnetic circuit of the EP system, including one or more of a backplate, an outer pole, an inner pole, or a center pole.

23 Claims, 12 Drawing Sheets

(56) References Cited

U.S. PATENT DOCUMENTS

2015/0128560 A1* 5/2015 Conversano .......... F03H 1/0075
60/202
2019/0366435 A1 12/2019 Firdosy et al.

OTHER PUBLICATIONS

Tong "Closed Loop Pulsating Heat Pipe" (Year: 2001).*
Lev, D. et al., "The technological and commercial expansion of electric propulsion". *Acta Astronautica*. (Jun. 2019) 159: 213-227.
Drolen B. L. et al., "Performance Limits of Oscillating Heat Pipes: Theory and Validation" *Journal of Thermophysics and Heat Transfer*, Apr. 2017, pp. 1-17.
Maghsoudi E. et al., "Efficient Thermal Management for Sampling Arm Actuators" *International Conference on Environmental Systems*, 2020, 10 pages.
Mazouffre, S. "Electric propulsion for satellites and spacecraft: established technologies and novel approaches." *Plasma Sources Science and Technology*, 25.3 (2016): 033002.

* cited by examiner

THERMALLY MANAGED ELECTRIC PROPULSION SYSTEMS

CROSS REFERENCE TO RELATED APPLICATIONS

The present application claims priority to and the benefit of co-pending U.S. provisional patent application Ser. No. 63/175,481 entitled "Thermally Managed Electric Propulsion Systems", filed on Apr. 15, 2021, the disclosure of which is incorporated herein by reference in its entirety.

STATEMENT OF GOVERNMENT GRANT

This invention was made with government support under Grant No. 80NMO0018D0004 awarded by NASA (JPL). The government has certain rights in the invention.

TECHNICAL FIELD

The present disclosure relates to electric propulsion systems. More particularly, it relates to thermal management of electric propulsion systems via embedded structures. Applications can include any electric propulsion system, including (but not limited to) gridded ion thrusters or Hall effect thrusters.

BACKGROUND

Electric propulsion systems (e.g., Hall effect thrusters, gridded ion thrusters) use applied electric and magnetic fields to accelerate ions to extremely high velocities in order to generate thrust for a spacecraft. They are one of the most efficient forms of thrust available to modern spacecraft and are becoming an increasingly popular choice for propulsion systems for both commercial communications satellites and NASA missions. While electric propulsion systems are one of the most efficient forms of thrust for a spacecraft, they can use large amounts of power and produce a significant amount of waste heat. For example, the HERMeS Hall thruster in development for NASA PPE mission generates about 1.2 kW of thermal energy as losses out of its 12.5 kW total power. Likewise, the 1-kW MaSMI thruster invented and in development at JPL under a Strategic Initiative is entirely constrained in its size and compactness by the thermal design of its structure.

A large fraction of the waste energy in a thruster can be rejected directly to space by radiation, but a significant amount may still be absorbed by the thruster body and therefore may have to be rejected by the thruster thermal control system. In fact, the design and performance of electric propulsion systems, such as Hall thrusters, ranging in size from 1 kW to 100 kW is presently limited by shortcomings in performance of their thermal control systems. While smaller thrusters may suffer from the highest Watt/power density, power density for larger size thrusters may only be slightly decreased. In spite of such decrease in power density and due to their (considerably) higher raw/effective thermal power, thermal control of the larger size thrusters may be challenging.

Teachings according to the present disclosure address challenges in thermal control of electric propulsion systems with an embedded thermal control solution that may be scaled to a size of a target propulsion system.

SUMMARY

According to a first aspect of the present disclosure, an electric propulsion (EP) system is presented, comprising: a discharge chamber with a longitudinal extension according to an axial direction of the EP system; and a magnetic circuit for generation in the discharge chamber of a magnetic field according to a radial direction of the EP system, wherein the magnetic circuit comprises: a monolithic structure with an embedded oscillating heat pipe (OHP).

According to a second aspect of the present disclosure, a method for thermal management of an electric propulsion (EP) system is presented, the method comprising: fabricating a magnetic circuit of the EP system as a monolithic structure; based on the fabricating, forming a continuous serpentine channel inside of the monolithic structure; filling the continuous serpentine channel with a working fluid; sealing the continuous serpentine channel, thereby embedding an oscillating heat pipe (OHP) in the magnetic circuit; forming a discharge chamber of the EP system within an annular region provided by the monolithic structure of the magnetic circuit, the magnetic circuit configured to generate a radial magnetic field inside of the discharge chamber; and based on the embedding of the OHP, thermally managing the EP system by increasing a thermal conductivity of the magnetic circuit.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure. Same reference designators refer to same features.

DETAILED DESCRIPTION

Figure 1A:
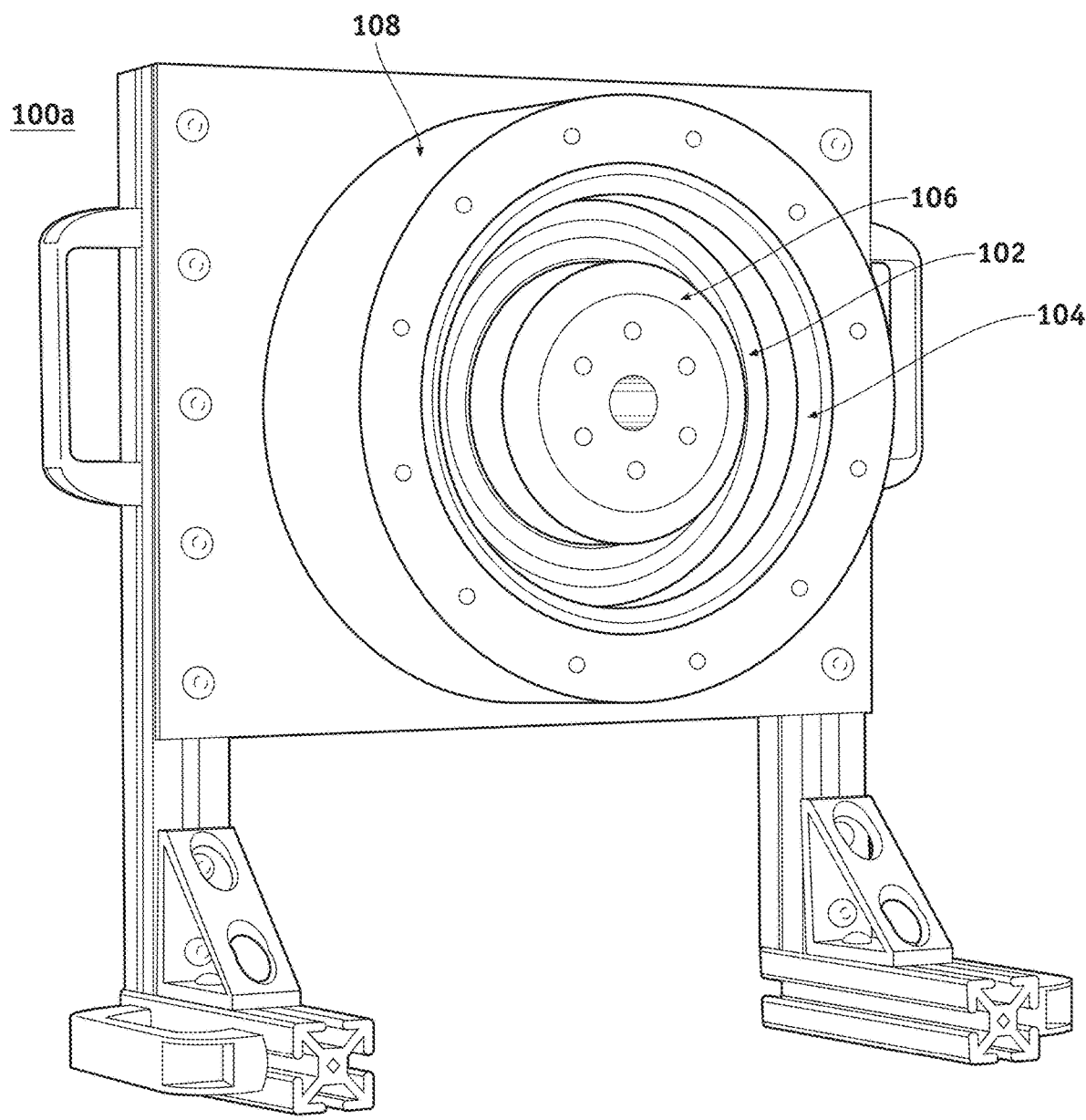
FIG. 1A shows a picture of a prior art electric propulsion (EP) system.
Figure 1B:
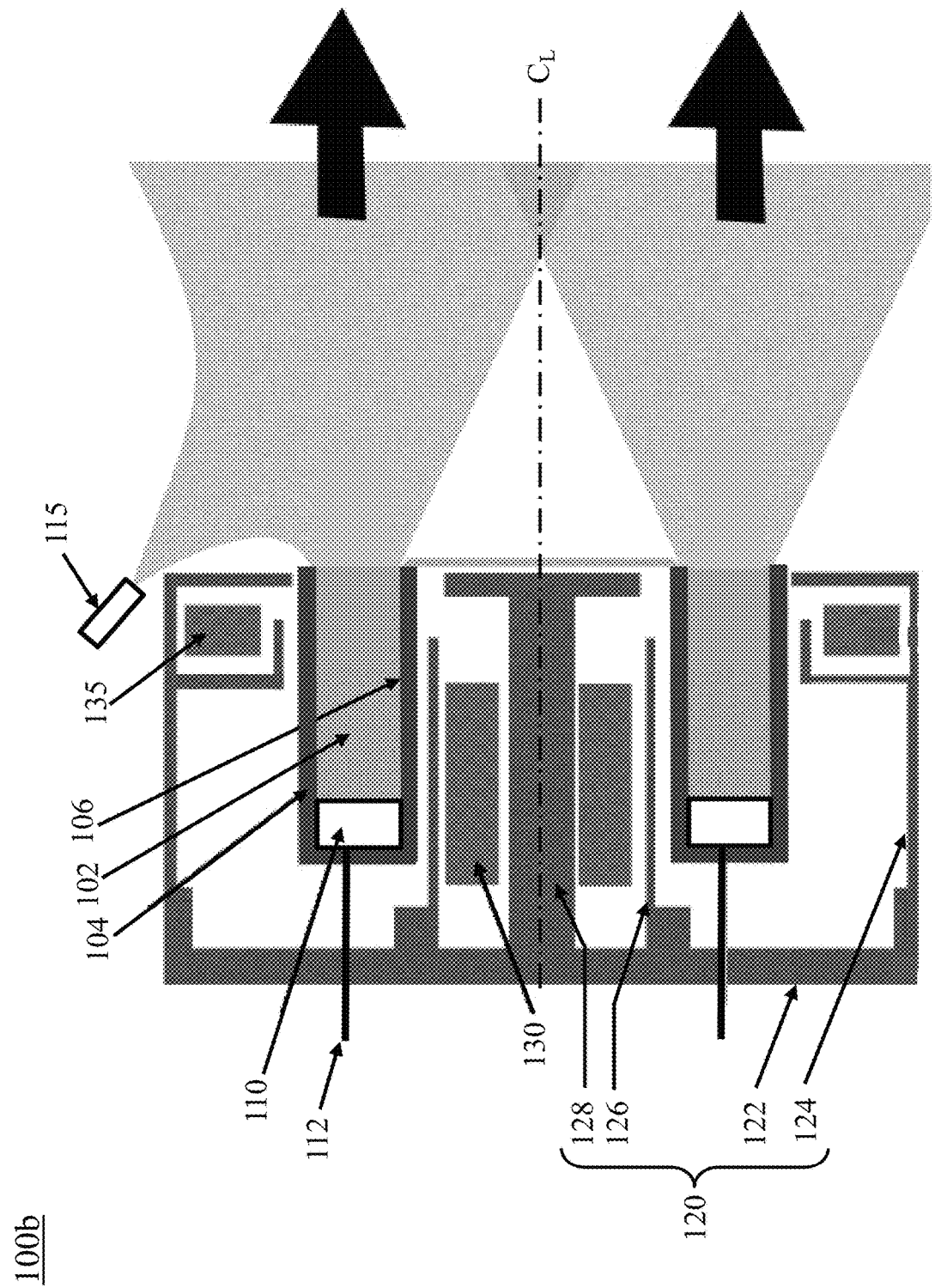
FIG. 1B shows a simplified cross-sectional schematic of the prior art EP system of FIG. 1A.

FIG. 1A shows a picture of a prior art electric propulsion (EP) system (100a). As shown in FIG. 1A, the EP system (100a) may include an axial symmetry about a center axis (e.g., $C_L$ of FIG. 1B) about which (annular) elements of the EP system (100a) may be arranged. These include, for example, a discharge chamber (102) laterally bounded by outer wall (104) and inner wall (106) that may be made from insulating and/or conductive material. Within the inner space of the discharge chamber (102), propellant ions may be accelerated via electric fields (e.g., Hall effect or electric grid electrodes) produced in the EP system (100a). Operation of the EP system (100a) may be further based on magnetic field lines produced within the inner space of the discharge chamber (100a) according to methods and techniques known to a person skilled in the art. FIG. 1B shows further details of internal elements of the prior art EP system (100a) for an exemplary case of a Hall thruster.

FIG. 1B shows a simplified cross-sectional schematic of the prior art EP system of FIG. 1A for an exemplary case of a Hall thruster. A Hall thruster typically uses a gas that can be ionized, such as Xenon, as the material that is accelerated by the thruster, which results in an equal and opposite acceleration experienced by the thruster (and the object/spacecraft to which it is attached). Xenon gas may be used because of its high atomic weight and low ionization potential. Other materials that can be used as propellants may include krypton, argon, iodine, bismuth, magnesium, or zinc.

As shown in FIG. 1B, within the inner space of the annular discharge chamber (102) bounded by walls (104, 106), an anode/gas distributor (110) coupled to an inlet (112) for feeding of propellant gas may be provided. In conjunction with the anode/gas distributor (110), a cathode neutralizer (115) may be provided, so that a voltage applied between the anode (e.g., 110) and the cathode (115) may generate free electrons within the discharge chamber (102) that may be accelerated by an (axial) electric field formed in the discharge chamber (102). A magnetic circuit (120) made of a magnetic material (e.g., soft magnetic material) may connect an inner magnetic coil (130) and an outer magnetic coil (135) so to provide, within the inner space of the discharge chamber (102), a radial magnetic field that is perpendicular to the electric field produced between the anode (e.g., 112) and the cathode (115). It should be noted that in some implementations, the cathode (115) may be arranged centrally within a region/cavity formed where element (128) is shown. Furthermore, in some implementations, the inner/outer magnetic coils (130, 135) may include or be replaced with magnets, such as, for example, annular magnets to produce the radial magnetic field in (or about) the discharge chamber (102).

In the discharge chamber (102), a combination of the radial magnetic field and the axial electric field may cause the electrons to drift in azimuth thus forming a Hall current that may include circulating high-energy electrons. In turn, such high-energy electrons may bombard (e.g., collide with) propellant atoms input into the discharge chamber (102) and accordingly ionize (a majority of) the propellant atoms to generate propellant ions that can accelerate axially out (as shown by large arrows in FIG. 1B) of the discharge chamber (102) under influence of the electric field produced between the anode (e.g., 112) and the cathode (115).

Because of interaction with discharge plasma produced within the discharge chamber (102), elements of the EP system shown in FIG. 1B may be subjected to elevated temperatures, in a range of several hundreds of degrees centigrade (e.g., 300 to over 600 degrees). Such elevated temperatures may be higher at the center of the EP system where the discharge chamber (102) is located and may gradually decrease radially outwardly through thermal conduction paths provided by the elements shown in FIG. 1B. Due to lack of any dedicated cooling system, heat generated within the EP system shown in FIG. 1B should optimally be (thermally) conducted to exterior surfaces (e.g., 108 of FIG. 1A) of the EP system and rejected into the vacuum of space via radiation from the exterior surfaces. However, corresponding thermal conduction paths may only be provided by some of the elements shown in FIG. 1B, mainly elements (122, 124, 126, 128) of the magnetic circuit (120) which may be fabricated from material that is selected, foremost, for its desired magnetic properties for operation in the EP system. A further hurdle to such passive cooling scheme is the interface between the various elements (122, 124, 126, 128) of the magnetic circuit (120) which may include fastened/bolted interfaces that can affect thermal conduction between such elements.

Due to the inability to reject internal heat in a prior art EP system (e.g., FIG. 1A), compromises in design of the system may be made which in turn may impact the performance and efficiency of the EP system. In general, an EP system may be forced to run at extremely high temperatures to accommodate the currently available methods of heat dissipation based purely on metal (thermal) conduction (and minimal rejection/radiation). However, this may cause a number of design problems, as the entire EP system may need to operate at temperatures that may be too high, or at the high end of supported temperatures, for some of the elements of the EP system. Thermal management of an EP system according to the present disclosure may allow foregoing of such prior art design compromises, thereby providing for a simplified EP system design with improved performance.

Teachings according to the present disclosure may take advantage of newer methods for 3D printing (e.g., additive manufacturing) of magnetic material, including soft magnetic material (e.g., having an intrinsic coercivity of less than 1000 A/m), such as, for example, Hiperco, or other (e.g., soft magnetic iron) that may be used, for example, in the magnetic circuit (120) of FIG. 1B. As known to a person skilled in the art, Hiperco (trade name, Hiperco 50) is an iron-cobalt vanadium soft magnetic alloy that exhibits a high magnetic saturation (24 kilogauss) while maintaining low core loss as compared to, for example, electrical steel.

Teachings according to the present disclosure may use 3D printing to form/embed/integrate structures within the internal elements of an EP system, such as the EP system described above with reference to FIG. 1A/1B, that may form an integrated thermal management system of the EP system. Such integrated thermal management system according to the present disclosure may include an active and passive single-phase and/or multi-phase thermal management system formed by structures integrated into the internal elements of the EP system including, for example, into the elements (122, 124, 126, 128) of the magnetic circuit (120) described above with reference to FIG. 1B. Such integrated structures within the internal elements of the EP system according to the present disclosure may increase effective thermal conductivity of the EP system structure from approximately 5 W/m-K to at least 10 W/m-K to over 1000 W/m-K.

Figure 1C:
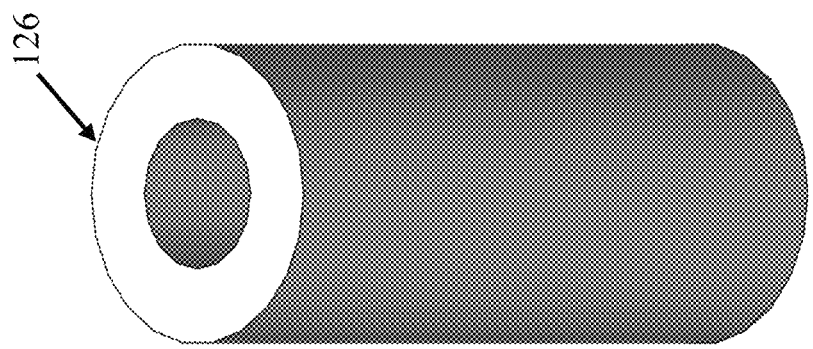
FIG. 1C shows (simplified) perspective views of an outer core, backplate and inner core of the prior art EP system of FIG. 1A.
Figure 1C:
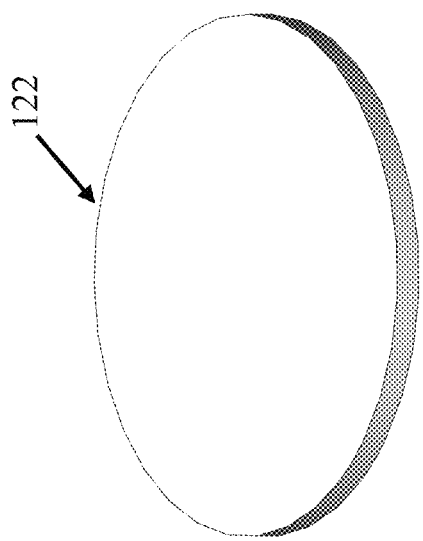
Figure 1C:
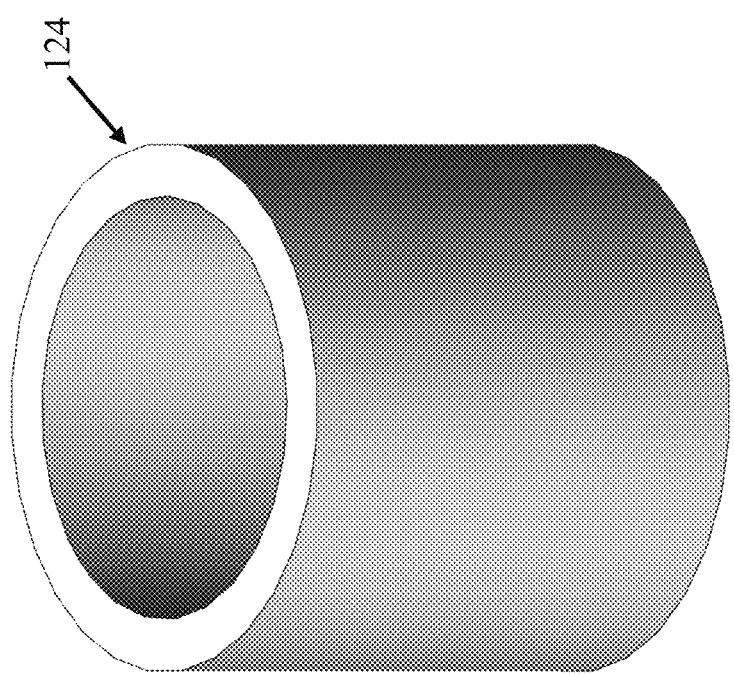

FIG. 1C shows (simplified) perspective views of (functional) elements (122, 124, 126) of the magnetic circuit (120) described above with reference to FIG. 1B. These include an outer core (124) having a tubular shape (e.g., cylindrical), a backplate (122, also known as backpole or baseplate) having a (substantially) flat and circular shape, and an inner core (126) having a tubular shape (e.g., cylindrical). As described above, in prior art EP systems, the elements (122, 124, 126) may be fastened/bolted to one another to form the magnetic circuit (120) of FIG. 1B having a symmetry about the center axis (e.g., $C_L$ of FIG. 1B). In particular, in such prior art EP systems, the outer core (124) and the inner core (126) may be respectively fastened/bolted to the backplate (122) via respective fasteners/bolts engaged through respective holes in the backplate (122, not shown in FIG. 1C). In some cases, element (128) of the magnetic circuit (120) of FIG. 1B, also known as a center pole, may be centrally fastened/bolted to the backplate (122). Teachings according to the present disclosure may integrate structures in any one of the elements (122, 124, 126) of FIG. 1C (and/or in element 128 of FIG. 1B), to increase the effective thermal conductivity of the EP system. Furthermore, according to an embodiment of the present disclosure, any two or more, including all, of the (functional) elements (122, 124, 126 and/or 128) may be formed (via additive manufacturing) as one monolithic structure that includes the integrated structures that provide the thermal management system of the present teachings.

As used herein, a monolithic structure may refer to a three-dimensional structure comprising functional elements bonded to one another via atomic bonds of a material (or materials) that makes the structure. This may therefore include a single material structure formed via subtractive manufacturing, a single or multi material structure formed via additive manufacturing, or a combination of the two. Accordingly, a monolithic structure according to the present disclosure may not include any fasteners/bolts or welding/glue to form a three-dimensional shape of the structure. By reducing (e.g., integrating) a plurality of internal (functional) elements (e.g., 122, 124, 126 of FIG. 1C) of an EP system to a single monolithic structure, enhanced thermal conductivity of such structure, and therefore of an EP system using such structure, may be provided. Furthermore, by reducing the plurality of internal (functional) elements of the EP system to a single monolithic structure, improved continuity and integration of the structures that form the thermal management system according to the present disclosure may be provided.

The monolithic structure according to the present disclosure may be manufactured through a variety of methods, known generically as additive manufacturing methods, including but not limited to powder bed fusion, direct energy deposition, ultrasonic additive manufacturing, wire arc additive manufacturing, binder jetting, bound metal deposition, bound powder extrusion, etc. Teachings according to the present disclosure may take advantage of flexibility and scalability provided by the additive manufacturing methods presently available to form single material or multi material monolithic structures with embedded thermal management.

The monolithic structure according to the present disclosure may be a multi material monolithic structure that may include monolithically integrated structures made of different materials. Use of the different materials may aim to avoid deleterious interactions between active elements (e.g., working fluids) of the thermal management system of the present teachings and functional structures/elements of the EP system (e.g., magnetic circuit and their performance). Such monolithically integrated structures may include claddings, plating, or functional gradients. In some exemplary embodiments of the present disclosure, the monolithically integrated structures may also include integrated weld couplings for fluid or structural joining.

According to an embodiment of the present disclosure, an embedded thermal management system for an EP system may be provided by channel segments that are formed within functional elements (e.g., 122, 124, 126, 128 of FIG. 1B) of the EP system. According to an embodiment of the present disclosure, such channel segments may form a continuous serpentine (meandering) channel that may extend through one or more of the functional elements of the EP system. According to an embodiment of the present disclosure, the continuous serpentine channel may form a channel path (e.g., OHP path) that alternates between hot and cold regions (and/or functional elements) of the EP system. According to an embodiment of the present disclosure, a number of alternations between the hot and cold regions may be increased for an increase in performance of the embedded thermal management system.

According to an exemplary embodiment of the present disclosure, the channel segments may have a substantially circular cross section with a diameter that is approximately 1 mm. According to an exemplary embodiment of the present disclosure, the channel segments may have a diameter in a range from 0.50 mm to 8.0 mm. Upper range diameters may be used for some liquid metals (as working fluid) in large (meter-scale) EP systems. According to other exemplary embodiments of the present disclosure, the channel segments may have a cross section that may not be circular, rather rectangular, trapezoidal or other. According to an embodiment of the present disclosure, the channel segments may include major channel segments in the axial or radial orientation/direction (with reference to target EP system). According to an embodiment of the present disclosure, the channel segments may include minor channel segments that join the major channel segments. According to an exemplary embodiment of the present disclosure, the minor channel segments may follow contours of a corresponding functional element. According to an embodiment of the present disclosure, design/routing of the channel segments may aim at reducing loss of magnetic material of the functional structures of the EP system while enabling an appropriate degree of thermal control provided by the channel segments (when filled and sealed with a working fluid).

According to an embodiment of the present disclosure, the continuous serpentine (meandering) channel according to the present disclosure may form an oscillating heat pipe (OHP) comprising a (pressure filled) working fluid that extends across functional elements of the EP system. According to an embodiment of the present disclosure, the working fluid may be chosen to increase an amount of latent heat in a liquid to vapor transition. According to an embodiment of the present disclosure, the working fluid may be further chosen to include a larger expansion ratio for a given temperature range of operation of a target EP system. According to an embodiment of the present disclosure, the working fluid may be further chosen based on a desired magnetic property of the working fluid which may accordingly influence local and/or global magnetic properties of the functional elements of the EP system within which the OHP is embedded. According to some embodiments, the working fluid may be chosen for a desired freezing point or critical point, as well as compatibility with structure/coatings it may be exposed to. The working fluid can also be chosen based on its heat capacity or density.

According to some nonlimiting exemplary embodiments of the present disclosure, the working fluid may include any one or more of: Glycerin, Heptane, Dowtherm G (a mixture of di- and tri-aryl compounds), Mercury, Sulphur, Cesium, NaK, Sodium, Potassium or Water. According to an exemplary embodiment of the present disclosure, the working fluid may be sealed within OHP via, for example, a pinch, crimp, or valve and cap arranged at least at one end of the continuous serpentine channel.

Figure 2A:
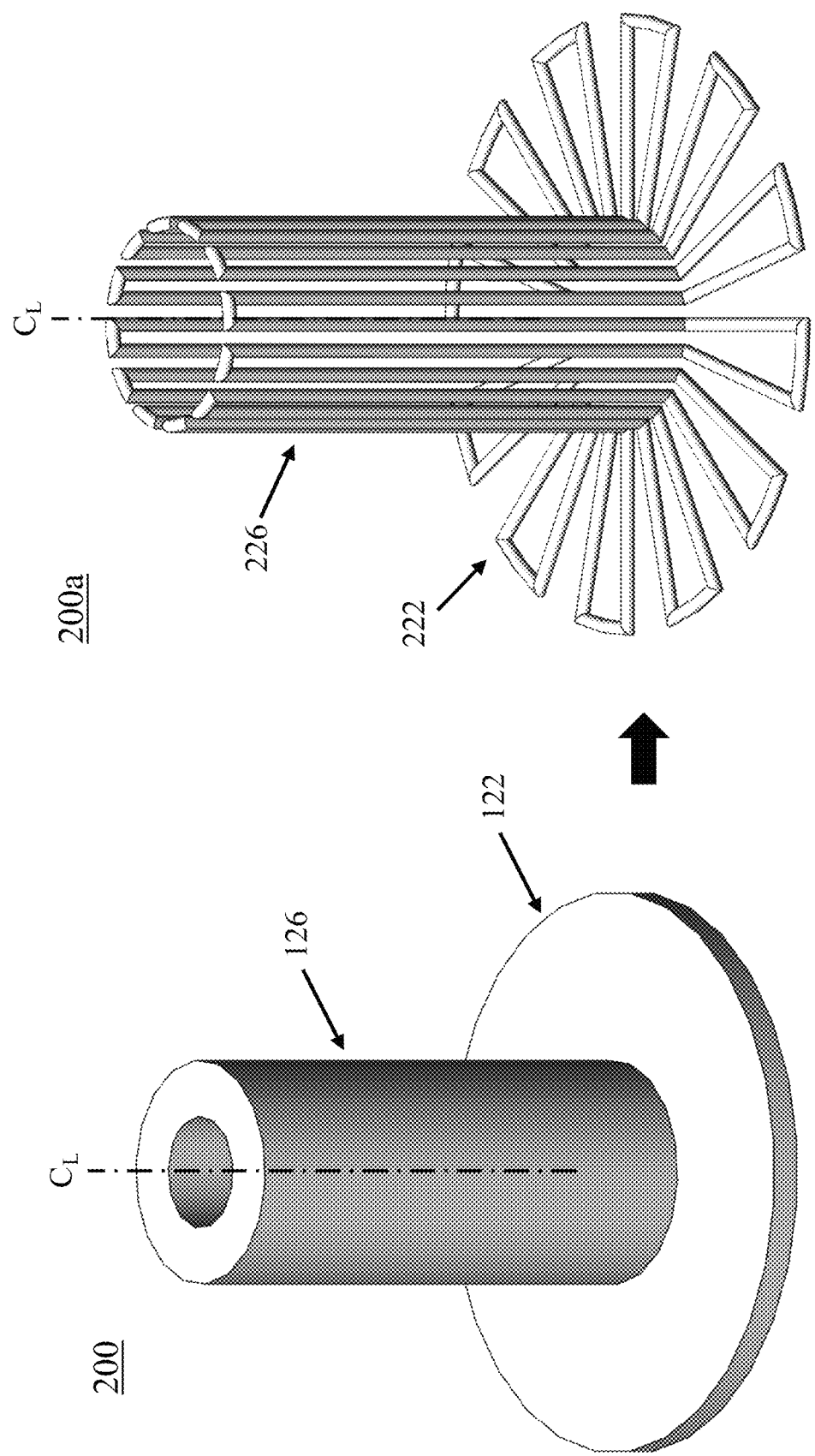
FIG. 2A shows (simplified) perspective views of a monolithic structure of an EP system according to an embodiment of the present disclosure with an embedded oscillating heat pipe (OHP).

FIG. 2A shows (simplified) perspective views of a monolithic structure (200) of an EP system (e.g., similar to 100b of FIG. 1B) according to an embodiment of the present disclosure with an embedded oscillating heat pipe (OHP, 200a). In the exemplary embodiment shown in FIG. 2A, the OHP (200a) may be embedded within the monolithic structure (200) that may include (monolithically integrated) functional elements (122, backplate) and (126, inner core) of a magnetic circuit (e.g., 120 of FIG. 1B) of a target EP system. As shown in (the right side of) FIG. 2A, the OHP (200a) may include channel segments (222) embedded within the backplate (122) and channel segments (226) embedded within the inner core (126), wherein the channel segments (222) and (226) may join to form a continuous serpentine channel of the OHP (200a). It should be noted that FIG. 2A includes two separate figures (left side and right side) to clearly show an external view of the monolithic structure (200, left side) and a corresponding embedded OHP (200a, right side) that is formed inside of the monolithic structure (200).

Figure 2B:
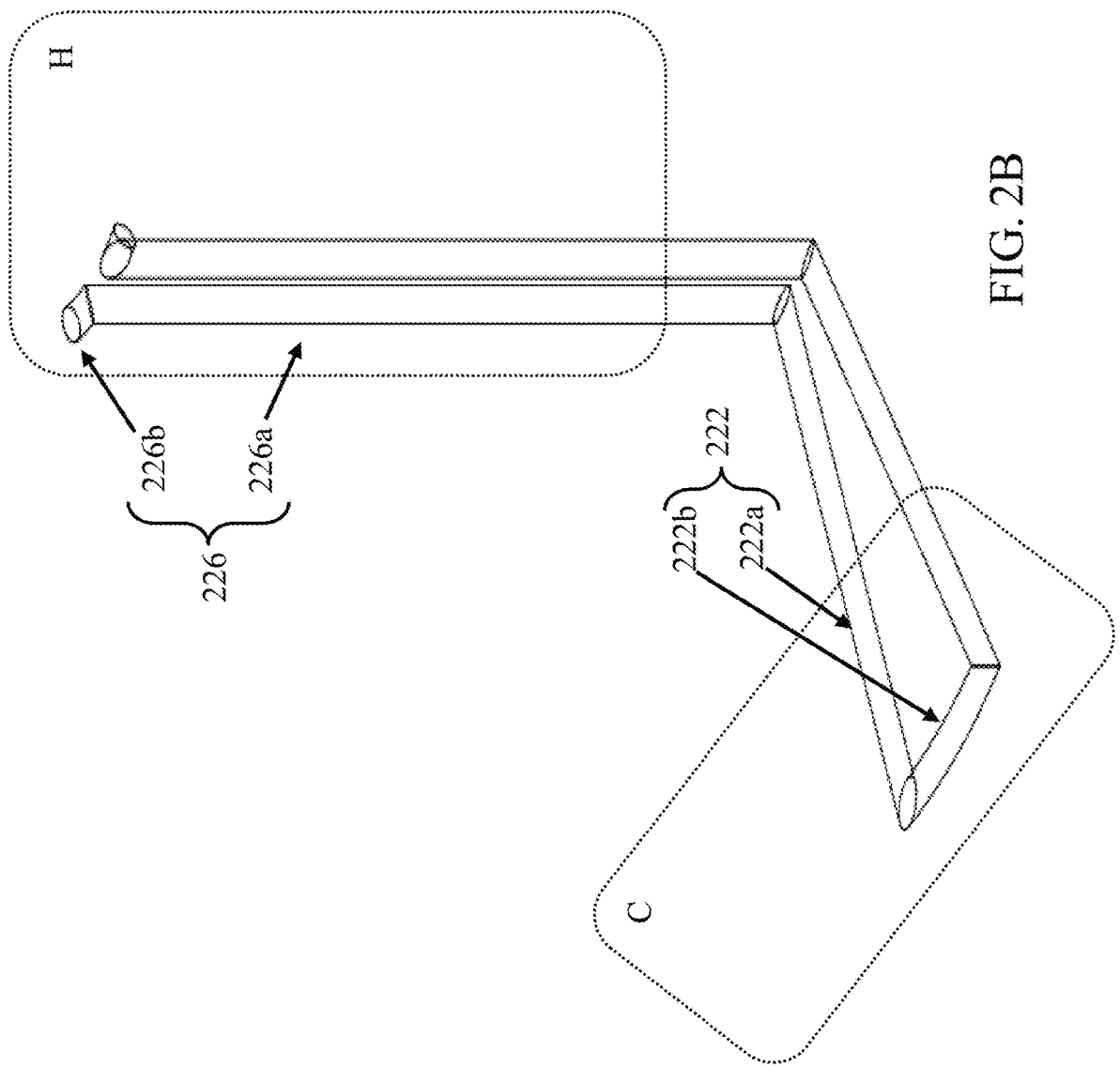
FIG. 2B shows details of the embedded OHP of the monolithic structure of FIG. 2A.

FIG. 2B shows further details of the embedded OHP (200a) of the monolithic structure (200) of FIG. 2A. In particular, shown in FIG. 2B are respective major channel segments (222a) and (226a), and corresponding minor channel segments (222b) and (226b), of the channel segments (222) and (226). As shown in FIG. 2B, the major channel segments (222a) may be oriented according to a radial direction of the backplate (122) (e.g., radial direction of the EP system), and the minor channel segments (222b) may be oriented according to an outer contour of the backplate (122, e.g., circular contour). On the other hand, as shown in FIG. 2B, the major channel segments (226a) may be oriented according to an axial direction of the inner core (126) (e.g., axial direction of the EP system), and the minor channel segments (226b) may be oriented according to an outer contour of the inner core (126, e.g., circular contour).

As shown in FIG. 2B, the channel segments (226) may provide alternating paths to a hot region (indicated in FIG. 2B as H) of the EP system where the inner core (126) is located, whereas the channel segments (222) may provide alternating paths to a cold region (indicated in FIG. 2B as C) of the EP system where an outer region of the backplate (122) is located. Accordingly, the OHP (200a) of FIG. 2A, that includes the continuous serpentine channel formed by the channel segments (222) and (226), may be likened to a thermal management system that includes an evaporator region (indicated in FIG. 2B as H), a condenser region (indicated in FIG. 2B as C), and an adiabatic region between the evaporator and condenser regions. During operation of the thermal management system according to the present disclosure, the OHP (200a) may absorb heat at the evaporator region, H, and may conduct the absorbed heat to the condenser region, C, through the adiabatic region. Because the condenser region, C, may be farther away from the center axis of the EP system, it may be inherently cooler, and therefore the OHP (200a) may be used to redistribute the heat in the (hotter) evaporator region (e.g., center region of the EP system) to the (cooler) condenser region, C. In other words, the OHP (200a) embedded within monolithically integrated functional structures (e.g., 122, 126) of an EP system (e.g., 100b of FIG. 1B) may be used to equalize heat in the EP system, and therefore remove/reduce heat in the hot regions (e.g., center) of the EP system.

Figure 3A:
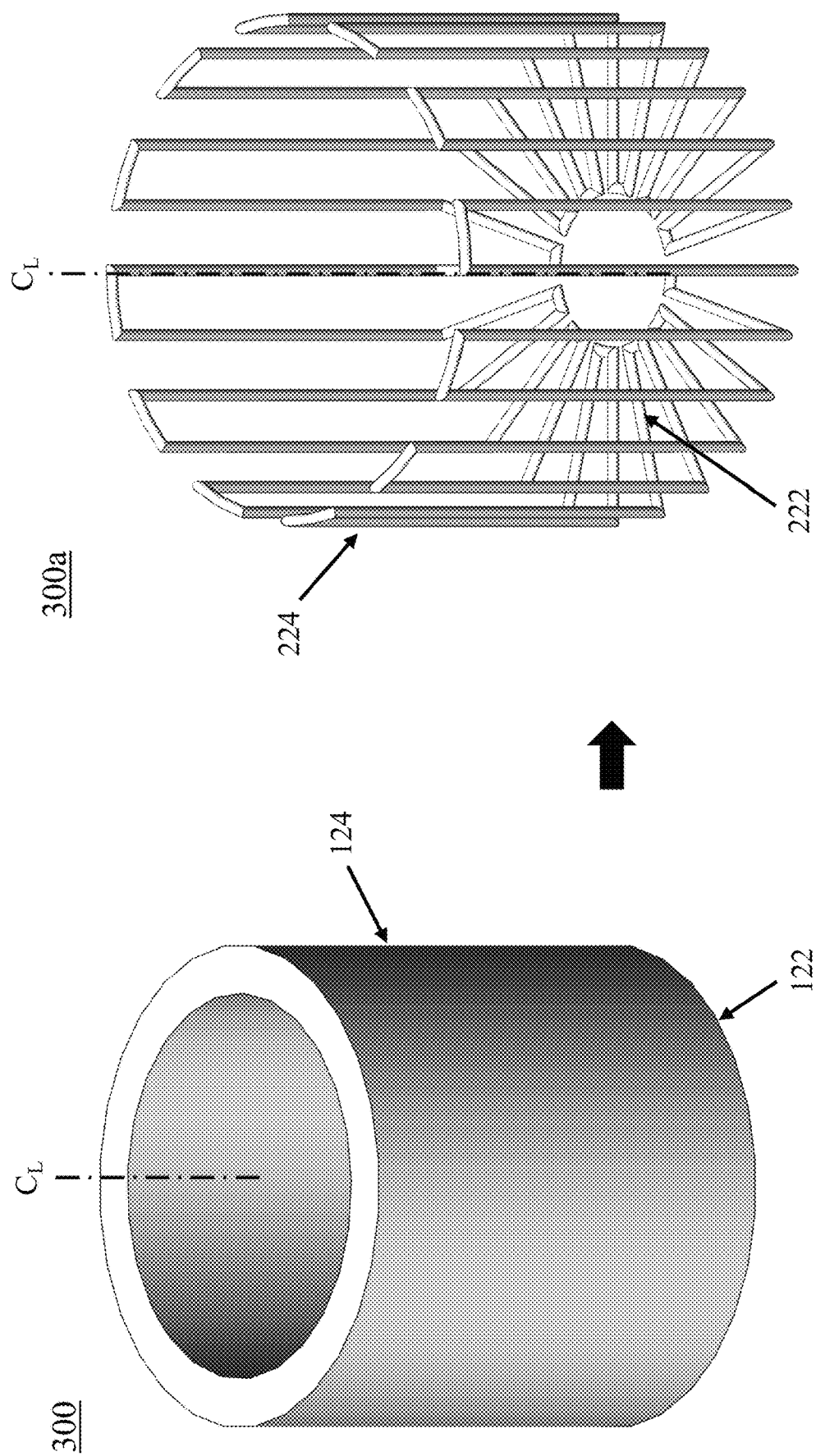
FIG. 3A shows (simplified) perspective views of another monolithic structure of an EP system according to an embodiment of the present disclosure with an embedded oscillating heat pipe (OHP).

FIG. 3A shows (simplified) perspective views of another monolithic structure (300) of an EP system (e.g., similar to 100b of FIG. 1B) according to an embodiment of the present disclosure with an embedded oscillating heat pipe (OHP, 300a). In the exemplary embodiment shown in FIG. 3A, the OHP (300a) may be embedded within the monolithic structure (300) that may include (monolithically integrated) functional elements (122, backplate) and (124, outer core) of a magnetic circuit (e.g., 120 of FIG. 1B) of a target EP system. As shown in (the right side of) FIG. 3A, the OHP (300a) may include channel segments (222) embedded within the backplate (122) and channel segments (224) embedded within the outer core (124), wherein the channel segments (222) and (224) may join to form a continuous serpentine channel of the OHP (300a).

Figure 3B:
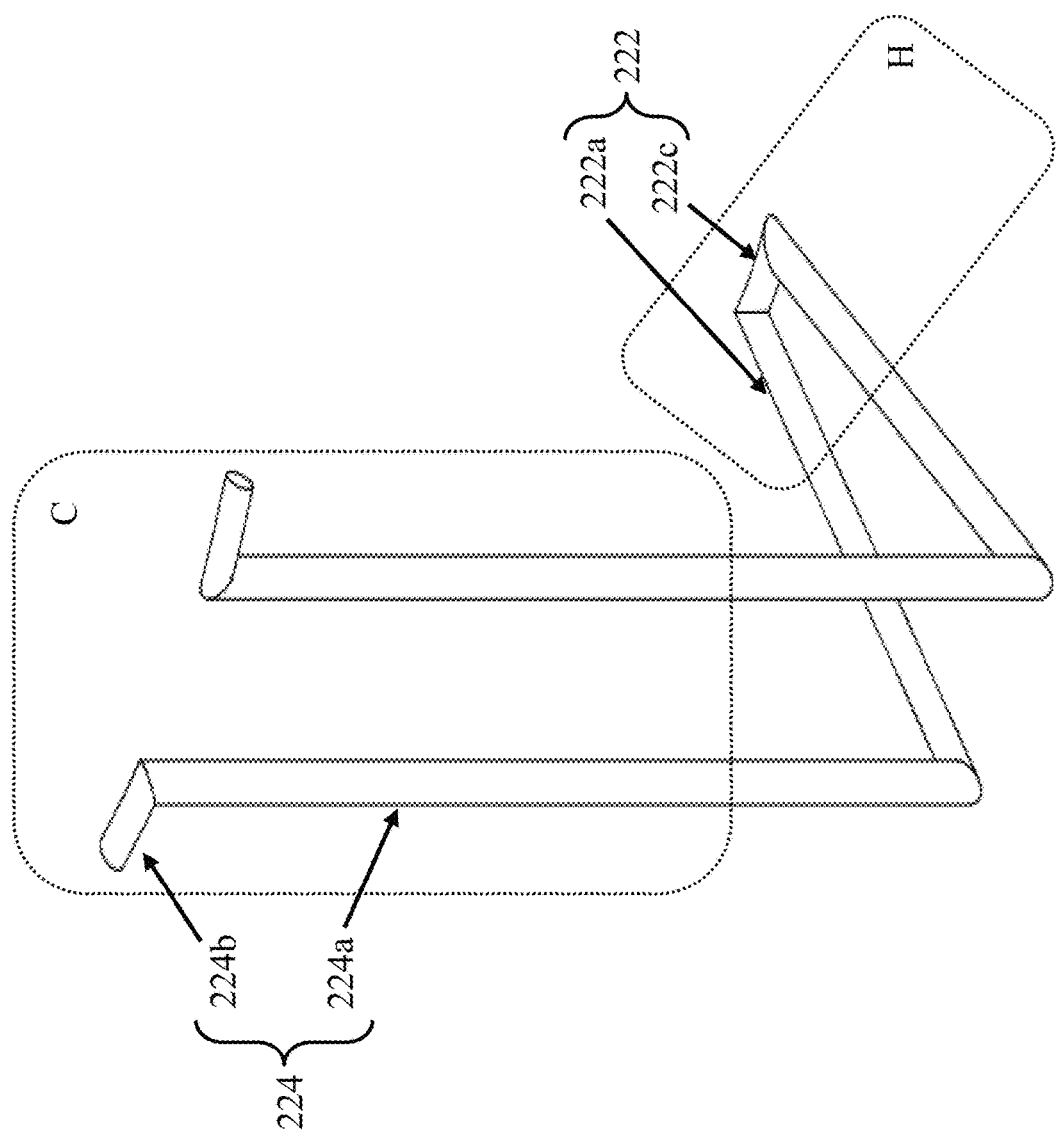
FIG. 3B shows details of the embedded OHP of the monolithic structure of FIG. 3A.

FIG. 3B shows further details of the embedded OHP (300a) of the monolithic structure (300) of FIG. 3A. In particular, shown in FIG. 3B are respective major channel segments (222a) and (224a), and corresponding minor channel segments (222c) and (224b), of the channel segments (222) and (224). As shown in FIG. 3B, the major channel segments (222a) may be oriented according to a radial direction of the backplate (122) (e.g., radial direction of the EP system), and the minor channel segments (222c) may be oriented according to an inner contour of the backplate (122, e.g., circular contour at about center region of the backplate). On the other hand, as shown in FIG. 3B, the major channel segments (224a) may be oriented according to an axial direction of the outer core (124) (e.g., axial direction of the EP system), and the minor channel segments (224b) may be oriented according to an outer contour of the outer core (124, e.g., circular contour).

As shown in FIG. 3B, the channel segments (222) may provide alternating paths to a hot region (indicated in FIG. 3B as H) of the EP system at an inner/center region of the backplate (120) where the inner core (e.g., 126, not shown in FIG. 3B) may be located, whereas the channel segments (224) may provide alternating paths to a cold region (indicated in FIG. 3B as C) of the EP system where an outer core (124) is located. Accordingly, the OHP (300a) of FIG. 3A, that includes the continuous serpentine channel formed by the channel segments (222) and (224), may be likened to a thermal management system that includes an evaporator region (indicated in FIG. 3B as H), a condenser region (indicated in FIG. 3B as C), and an adiabatic region between the evaporator and condenser regions. During operation of the thermal management system according to the present disclosure, the OHP (300a) may absorb heat at the evaporator region, H, and may conduct the absorbed heat to the condenser region, C, through the adiabatic region. Because the condenser region, C, may be farther away from the center axis of the EP system, it may be inherently cooler, and therefore the OHP (300a) may be used to redistribute the heat in the (hotter) evaporator region (e.g., center region of the EP system) to the (cooler) condenser region, C. In other words, the OHP (300a) embedded within monolithically integrated functional structures (e.g., 122, 124) of an EP system (e.g., 100b of FIG. 1B) may be used to equalize heat in the EP system, and therefore remove/reduce heat in the hot regions (e.g., center) of the EP system.

Figure 4A:
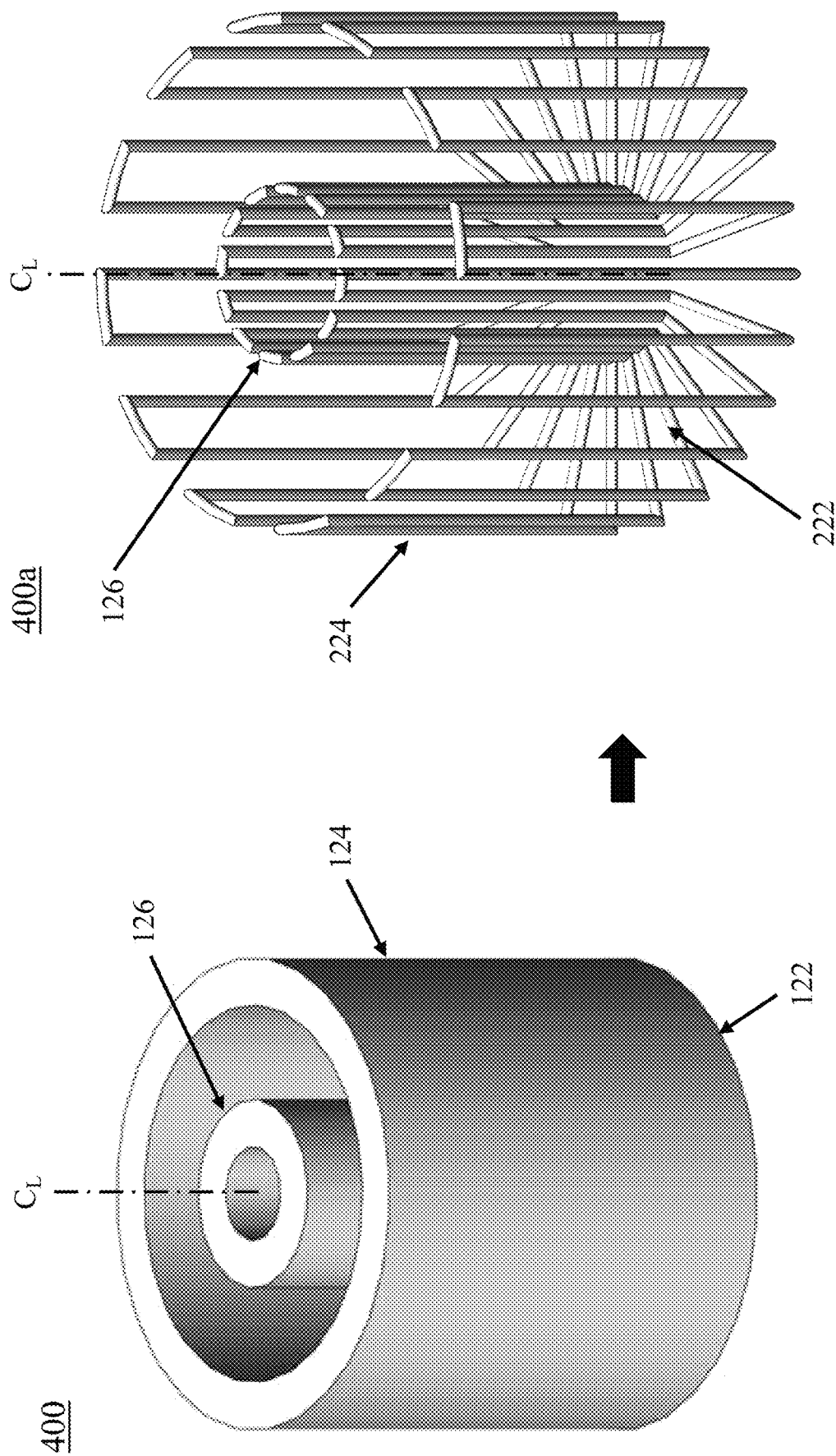
FIG. 4A shows (simplified) perspective views of yet another monolithic structure of an EP system according to an embodiment of the present disclosure with an embedded oscillating heat pipe (OHP).

FIG. 4A shows (simplified) perspective views of another monolithic structure (400) of an EP system (e.g., similar to 100b of FIG. 1B) according to an embodiment of the present disclosure with an embedded oscillating heat pipe (OHP, 400a). In the exemplary embodiment shown in FIG. 4A, the OHP (400a) may be embedded within the monolithic structure (400) that may include (monolithically integrated) functional elements (122, backplate), (124, outer core) and (126, inner core) of a magnetic circuit (e.g., 120 of FIG. 1B) of a target EP system. As shown in (the right side of) FIG. 4A, the OHP (400a) may include channel segments (222) embedded within the backplate (122), channel segments (224) embedded within the outer core (124), channel segments (226) embedded within the inner core (126), wherein the channel segments (222), (224), and (226) may join to form a continuous serpentine channel of the OHP (400a).

Figure 4B:
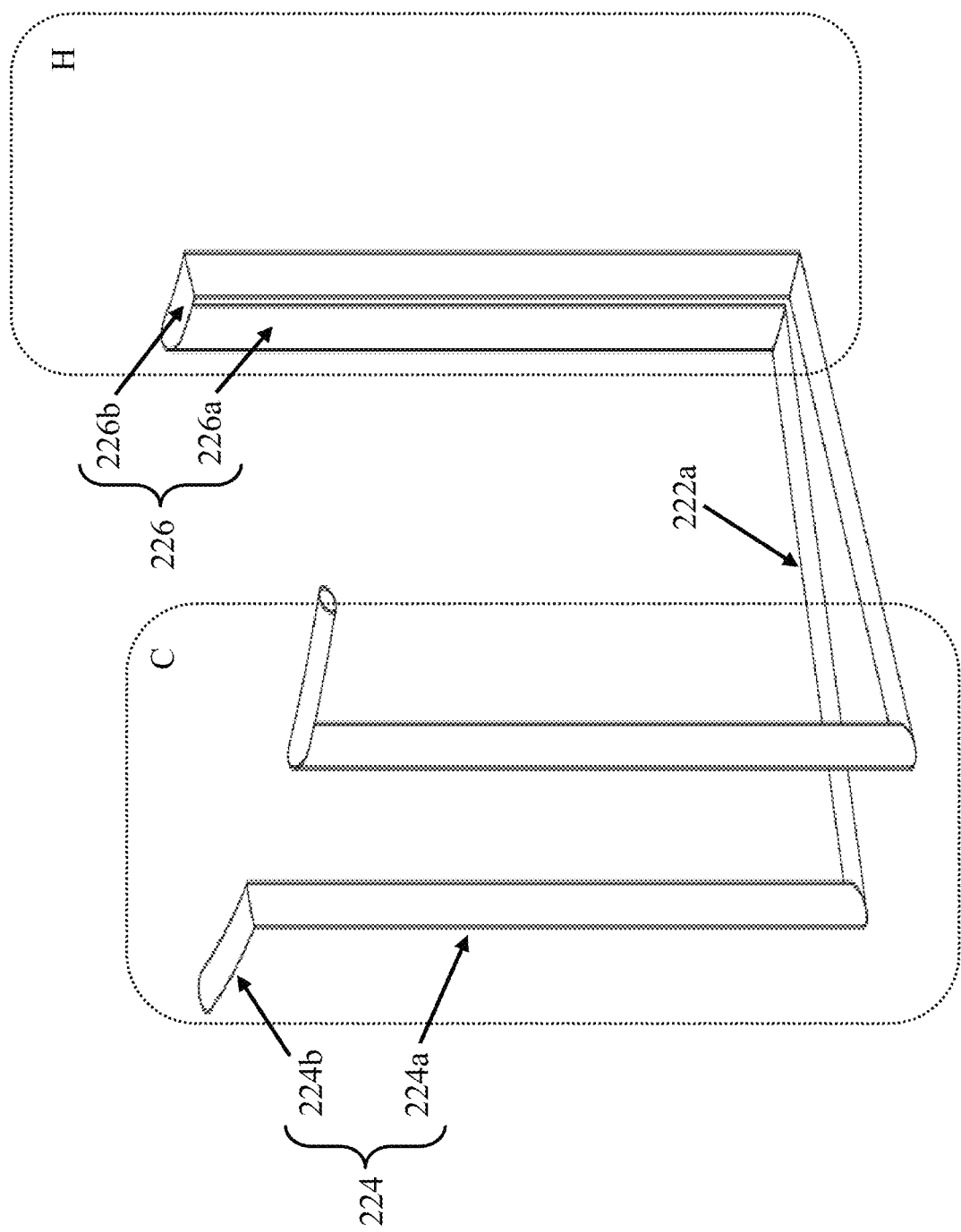
FIG. 4B shows details of the embedded OHP of the monolithic structure of FIG. 4A.

FIG. 4B shows further details of the embedded OHP (400a) of the monolithic structure (400) of FIG. 4A. In particular, shown in FIG. 4B are respective major channel segments (222a, same as 222 of FIG. 4A), (224a) and (226a), and corresponding minor channel segments (224b) and (226b), of the channel segments (222) and (224). As shown in FIG. 4B, the major channel segments (222a) may be oriented according to a radial direction of the backplate (122) (e.g., radial direction of the EP system). On the other hand, as shown in FIG. 4B, the major channel segments (224a) and (226a) may be oriented according to an axial direction of the outer/inner core (124, 126) (e.g., axial direction of the EP system), and the minor channel segments (224b) and (226b) may be oriented according to an outer contour of the outer or inner core (124, 126, e.g., respective circular contours).

As shown in FIG. 4B, the channel segments (226, and inner portion of 222) may provide alternating paths to a hot region (indicated in FIG. 4B as H) of the EP system at an inner/center region of the backplate (120) where the inner core (126) is located, whereas the channel segments (224, and outer portion of 222) may provide alternating paths to a cold region (indicated in FIG. 4B as C) of the EP system where the outer core (124) is located. Accordingly, the OHP (400a) of FIG. 3A, that includes the continuous serpentine channel formed by the channel segments (222), (224) and (226), may be likened to a thermal management system that includes an evaporator region (indicated in FIG. 4B as H), a condenser region (indicated in FIG. 4B as C), and an adiabatic region between the evaporator and condenser regions. During operation of the thermal management system according to the present disclosure, the OHP (400a) may absorb heat at the evaporator region, H, and may conduct the absorbed heat to the condenser region, C, through the adiabatic region. Because the condenser region, C, may be farther away from the center axis of the EP system, it may be inherently cooler, and therefore the OHP (400a) may be used to redistribute the heat in the (hotter) evaporator region (e.g., center region of the EP system) to the (cooler) condenser region, C. In other words, the OHP (400a) embedded within monolithically integrated functional structures (e.g., 122, 124, 126) of an EP system (e.g., 100b of FIG. 1B) may be used to equalize heat in the EP system, and therefore remove/reduce heat in the hot regions (e.g., center) of the EP system.

The monolithic structures with embedded oscillating heat pipes described above with reference to, for example, FIGS. 2A/3A/4A, exemplify possible structures of heat management systems that may be embedded in an EP system according to the present disclosure. Although such embodiments are described with respect to some of the functional elements of a magnetic circuit (e.g., 120 of FIG. 1B) of an EP system, as described above, they may equally apply to any of the functional elements of the magnetic circuit, including, for example, the center pole (e.g., 128 of FIG. 1B) or other. Furthermore, although increased efficiency of the proposed thermal management system may be provided by forming a continuous serpentine (meandering) channel that may extend between hotter and colder regions of the EP system, and therefore, as exemplified in the embodiments of FIGS. 2A/3A/4A, through several of the functional elements (e.g., 122, 124, 126, 128) of the magnetic system (e.g., 120 of FIG. 1B), some thermal advantages may also be provided by limiting/confining the continuous serpentine (meandering) channel within a single functional element as shown in FIG. 5A, FIG. 5B and FIG. 5C.

Figure 5C:
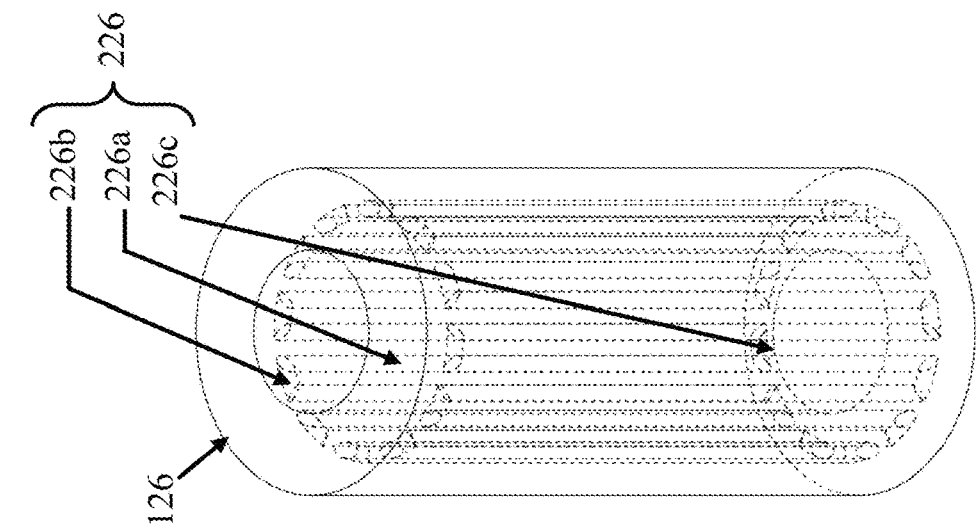
FIG. 5C shows a (simplified) perspective view of an inner core of an EP system according to an embodiment of the present disclosure with embedded OHP.
Figure 5B:
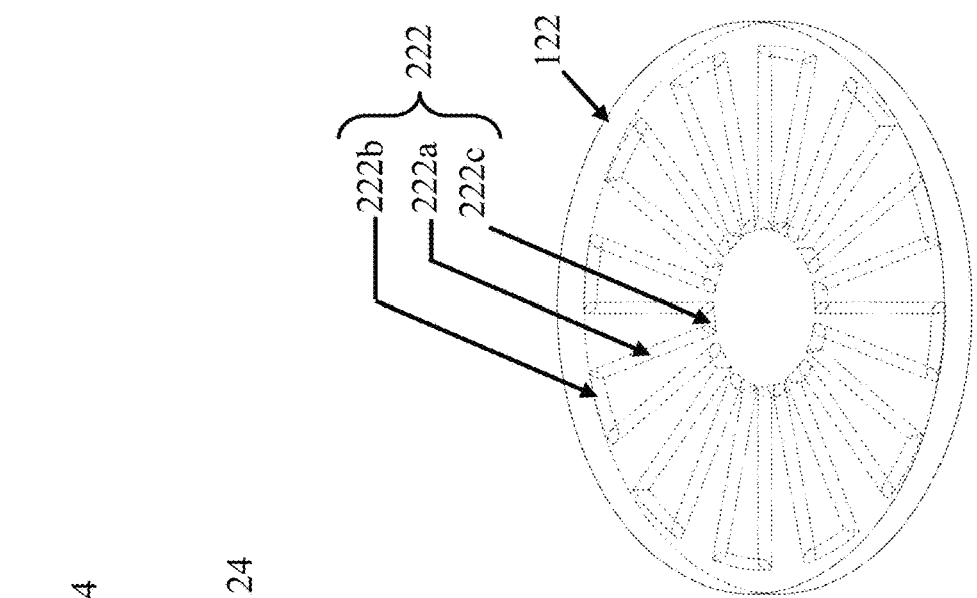
FIG. 5B shows a (simplified) perspective view of a backplate of an EP system according to an embodiment of the present disclosure with embedded OHP.
Figure 5A:
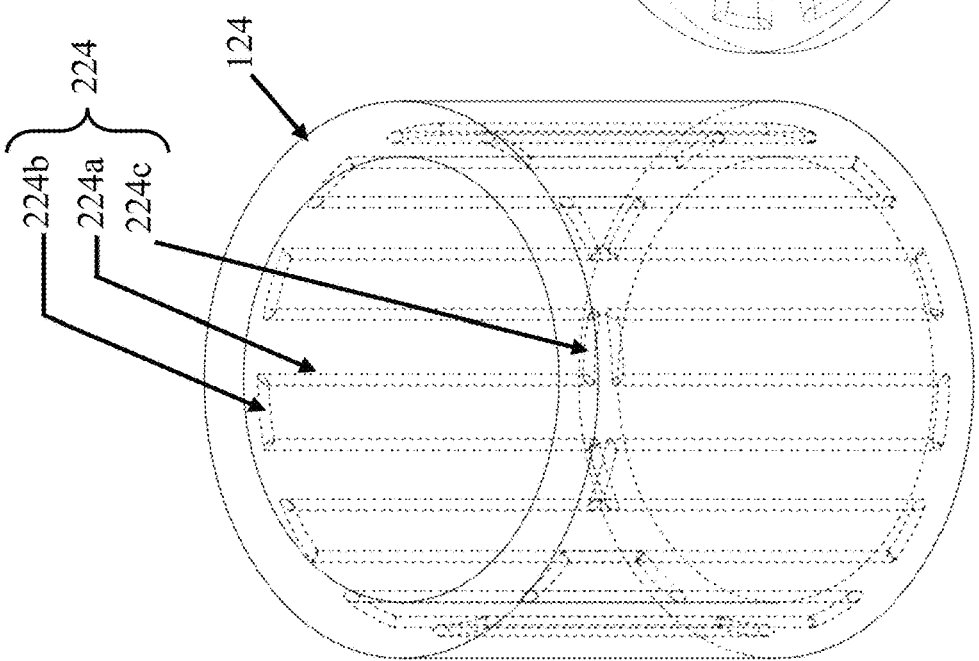
FIG. 5A shows a (simplified) perspective view of an outer core of an EP system according to an embodiment of the present disclosure with embedded OHP.

FIG. 5A shows a (simplified) perspective view of an outer core (124) of an EP system according to an embodiment of the present disclosure with an embedded OHP comprising channel segments (224). Because the channel segments (224) may be confined to the single (monolithic) functional structure (124), they may include top and bottom minor channel segments (224b) and (224c) that join the major channel segments (224a). As shown in FIG. 5A, the major channel segments (224a) may be in the axial direction whereas the minor channel segments (224b, 224c) may follow a (circular) contour of the outer core (124).

FIG. 5B shows a (simplified) perspective view of a backplate (122) of an EP system according to an embodiment of the present disclosure with an embedded OHP comprising channel segments (222). Because the channel segments (222) may be confined to the single (monolithic) functional structure (122), they may include outer and inner minor channel segments (222b) and (222c) that join the major channel segments (222a). As shown in FIG. 5B, the major channel segments (222a) may be in the radial direction whereas the minor channel segments (222b, 222c) may follow a (circular) contour at an outer or inner radial region of the backplate (122).

FIG. 5C shows a (simplified) perspective view of an outer core (126) of an EP system according to an embodiment of the present disclosure with an embedded OHP comprising channel segments (226). Because the channel segments (226) may be confined to the single (monolithic) functional structure (126), they may include top and bottom minor channel segments (226b) and (226c) that join the major channel segments (226a). As shown in FIG. 5C, the major channel segments (226a) may be in the axial direction whereas the minor channel segments (226b, 226c) may follow a (circular) contour of the outer core (124).

According to an embodiment of the present disclosure, any one or more of the embodiments described above with reference to FIGS. 5A/5B/5C may be used to provide thermal management of an EP system. In other words, any one or more of: the outer core (124) of FIG. 5A with respective embedded (OHP) channel segments (224); the backplate (122) of FIG. 5B with respective embedded (OHP) channel segments (222); or the inner core (126) of FIG. 5C with respective embedded (OHP) channel segments (226), may be used (in combination) to provide a magnetic circuit of an EP system. In such configuration, such functional structures may be coupled/fixated to one another via any known in the art techniques, including, for example, fasteners, bolts and nuts, or weld joints.

According to an embodiment of the present disclosure, any of the embedded thermal management systems described above may be (thermally) coupled to a secondary, or more expansive, thermal management system which may reject heat to radiators that may be dedicated to the EP system. These radiators may be kept thermally isolated from the rest of the spacecraft structure, and allowed to operate at higher temperatures, thereby improving their efficiency due to an increased gradient between the heat rejection surfaces and space. For one example, one or more OHPs may be integrated throughout the heated portion of the EP system (e.g., functional elements 122, 124, 126, 128 of FIG. 1B) to create an embedded thermal management system with an effective thermal conductivity 10× the base material, which then interacts with a secondary thermal management system to remove heat from a larger region (e.g., a radiator). Two such implementations of secondary thermal management systems are shown in FIG. 6 and FIG. 7.

Figure 6:
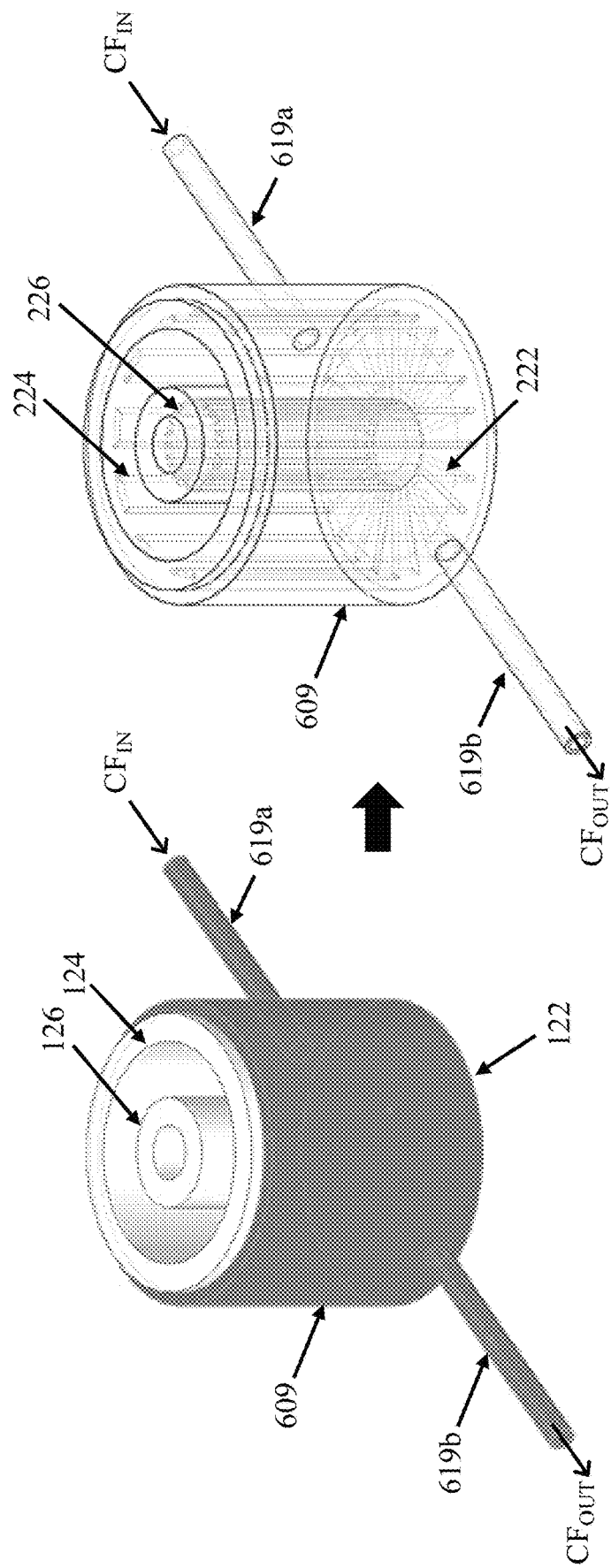
FIG. 6 shows (simplified) perspective views of an EP system with embedded OHP coupled to a secondary thermal management system including a cylindrical heat exchanger.

FIG. 6 shows (simplified) perspective views of an EP system with embedded OHP according to the present teachings coupled to a secondary thermal management system that may include a cylindrical heat exchanger (609). The EP system may include any of the above-described embodiments for provision of embedded OHPs (e.g., channel segments 222, 224, 226) in functional elements (e.g., 122, 124, 126) of the EP system. As shown in FIG. 6, the cylindrical heat exchanger (609) of the secondary thermal management system may surround (e.g., be wrapped around) the outer core (124) of the EP system so to extract the heat conducted to the outer core (124) and reject the heat through a corresponding subsystem that may include, for example, a radiator (not shown). Extraction of the heat from the outer core (124) may be provided via a (cold) working fluid, $CF_{IN}$, that is fed through an inlet segment (619a) of a pipe connected to the cylindrical heat exchanger (609). As the working fluid, $CF_{IN}$, circulates within inner channels (not shown in FIG. 6) of the cylindrical heat exchanger (609), it absorbs/extracts heat from the outer core (124) and outputs a corresponding (hot) working fluid, $CF_{OUT}$, at an outlet segment (619b) of the pipe connected to the cylindrical heat exchanger (609). After cooling (e.g., at a remote radiator), the working fluid returns to the inlet segment (619a) to continue the process of extracting heat from the EP system. According to other exemplary embodiments, heat extracted by the cylindrical heat exchanger (609) may be routed to a waste heat recovery system (instead of a radiator) such as a thermoelectric or a Stirling engine. Waste heat could also be recovered and (partially or in full) rerouted to other parts of the spacecraft to keep such parts warm (e.g., chemical propulsion tank or avionics system).

Figure 7:
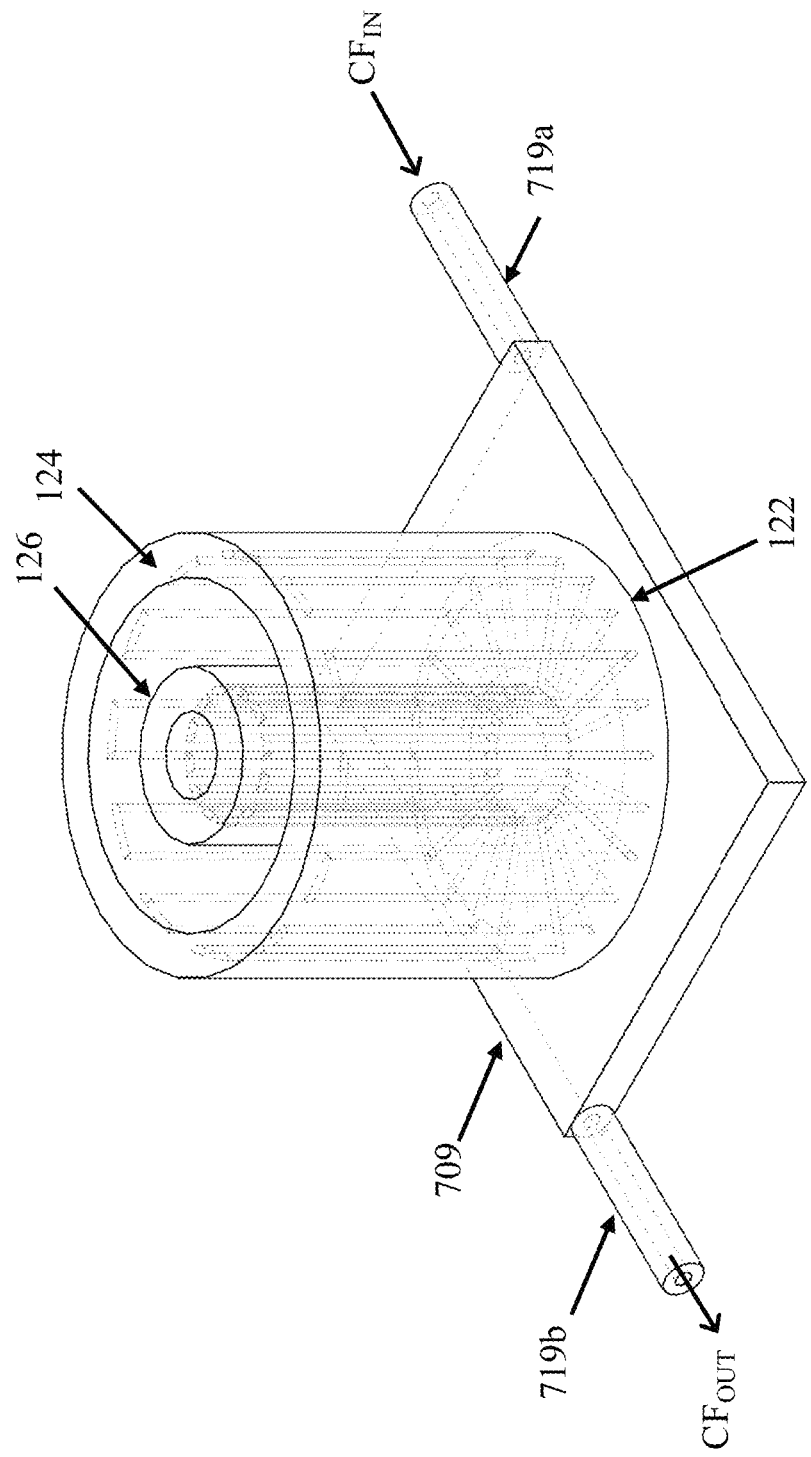
FIG. 7 shows (simplified) perspective views of an EP system with embedded OHP coupled to a secondary thermal management system including a baseplate heat exchanger.

A secondary thermal management system with operation analogous to the one described above with reference to FIG. 6 is shown in FIG. 7. In this case, instead of extraction of heat via a cylindrical heat exchanger (e.g., 609 of FIG. 6), extraction of the heat is provided via a baseplate (709) that is coupled to the backplate (122) of the EP system as shown in FIG. 7. Cold working fluid, $CF_{IN}$, is fed into the baseplate (709) through the inlet (719a) and output from the baseplate (709) as hot working fluid, $CF_{OUT}$, through the outlet (719b). It should be noted that features of the secondary thermal management systems of FIG. 6 and FIG. 7 may be combined into one secondary thermal management system that uses the cylindrical heat exchanger (609) of FIG. 6 in combination with the baseplate (709) of FIG. 7 to extract heat from the outer core (124) and backplate (122) of the EP system. Furthermore, it should be noted that the (single-phase, pumped) secondary thermal management systems with integrated heat exchanger described with reference to FIGS. 6-7 may not be construed as limiting the scope of the present disclosure as other type of thermal management systems, including two-phase thermal management systems may be integrated/coupled/mated to the EP system with embedded OHP according to the present teachings. Such two-phase thermal management systems may include, for example, heat pipes, loop heat pipes, pumped multi-phase evaporators, OHPs, or other. For such two-phase thermal management systems, the integrated heat exchanger may function similar to an evaporator segment described above with reference to, for example, FIGS. 2B/3B/4B.

As described above, teachings according to the present disclosure may use 3D printing to form/embed/integrate structures of a thermal management system within internal elements of an EP system, such structures including (internal) channel segments that join to form a continuous serpentine (meandering) channel that may extend through one or more of the functional elements of the EP system. Various process steps involved in the making of the thermal management system according to the present disclosure may include: 1) create nominal design; 2) design channel paths for optimizing heat transfer, including serpentine path which sufficiently high number of alternations between hot and cold regions; 3) model influence of removal of magnetic material for working fluid lines/channels and revise line geometry to minimize magnetic impact (may include topology optimization and/or multi-physics simulation, etc.); 4) convert solid model to surface mesh and import to build preparation software; 5) print on metal printer; 6) removal of powder from tapped channels; 7) Perform machining operations; 8) Perform any required heat treat to optimize mechanical/magnetic properties; 9) Vacuum gases out of the channels in part, then backfill with desired mass/pressure of chosen working fluid for OHPs; 10) Seal filling tube off with e.g., pinch, crimp, or valve & cap to permanently seal; and 11) Integrate part into rest of the EP system.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The invention claimed is:
1. An electric propulsion (EP) system, comprising:
a discharge chamber with a longitudinal extension according to an axial direction of the EP system; and
a magnetic circuit for generation in the discharge chamber of a magnetic field according to a radial direction of the EP system,
wherein the magnetic circuit comprises:
a monolithic structure with an integrated continuous serpentine channel for provision of an embedded oscillating heat pipe (OHP).

2. The electric propulsion (EP) system of claim 1, wherein:
the monolithic structure includes at least one of: a backplate; an outer core; or an inner core of the magnetic circuit.

3. The electric propulsion (EP) system of claim 1, wherein:
the monolithic structure includes a backplate and an inner core of the magnetic circuit that are monolithically integrated into one structure.

4. The electric propulsion (EP) system of claim 1, wherein:
the monolithic structure includes a backplate and an outer core of the magnetic circuit that are monolithically integrated into one structure.

5. The electric propulsion (EP) system of claim 1, wherein:
the monolithic structure includes a backplate, an inner core, and an outer core of the magnetic circuit that are monolithically integrated into one structure.

6. The electric propulsion (EP) system of claim 1, wherein:
the monolithic structure is made from a single magnetic material having a coercivity of less than 1000 A/m.

7. The electric propulsion (EP) system of claim 1, wherein:
the monolithic structure is made from at least one single magnetic material having a coercivity of less than 1000 A/m.

8. The electric propulsion (EP) system of claim 1, wherein:
the continuous serpentine channel is formed inside of the monolithic structure and at an offset from a center axis of the EP system.

9. The electric propulsion (EP) system of claim 8, wherein:
the continuous serpentine channel is a sealed channel that is filled with a working fluid.

10. The electric propulsion (EP) system of claim 8, wherein:
the continuous serpentine channel forms a path of the embedded OHP that alternates between hot and cold regions of the EP system.

11. The electric propulsion (EP) system of claim 8, wherein:
the continuous serpentine channel includes a plurality of major channel segments, each major channel segment of the plurality of major channel segments extending along the axial direction or the radial direction of the EP system.

12. The electric propulsion (EP) system of claim 11, wherein:
the continuous serpentine channel further includes a plurality of minor channel segments, each minor channel segment of the plurality of minor channel segments joining two major channel segments of the plurality of major channel segments.

13. The electric propulsion (EP) system of claim 12, wherein:
the plurality of minor channel segments follows an outer circular contour of an inner or outer core of the magnetic circuit.

14. The electric propulsion (EP) system of claim 12, wherein:
the plurality of minor channel segments follows an outer or inner circular contour of a backplate of the magnetic circuit.

15. The electric propulsion (EP) system of claim 1, wherein:
the discharge chamber is annular about a center axis of the EP system, the center axis being the center axis according to the axial direction of the EP system, and
the monolithic structure radially and axially surrounds the discharge chamber.

16. The electric propulsion (EP) system of claim 15, wherein:
the embedded OHP includes alternating axial paths arranged radially inwardly and radially outwardly of the discharge chamber.

17. The electric propulsion (EP) system of claim 1, wherein:
the embedded OHP includes a sealed working fluid, the sealed working fluid comprising one or more of: Glycerin, Heptane, Dowtherm G (a mixture of di- and tri-aryl compounds), Mercury, Sulphur, Cesium, NaK, Sodium, Potassium or Water.

18. The electric propulsion (EP) system of claim 1, wherein:
the EP system is a Hall effect thruster.

19. The electric propulsion (EP) system of claim 1, further comprising:
a secondary thermal management system that is thermally coupled to the monolithic structure, the secondary thermal management system configured to:
extract heat from the monolithic structure of the EP system,
conduct extracted heat to a remote radiator, and
reject heat through the remote radiator.

20. The electric propulsion (EP) system of claim 19, wherein:
the secondary thermal management system includes a cylindrical heat exchanger that is thermally coupled to an outer core of the magnetic circuit that is part of the monolithic structure.

21. The electric propulsion (EP) system of claim 19, wherein:
the secondary thermal management system includes a baseplate heat exchanger that is thermally coupled to a backplate of the magnetic circuit that is part of the monolithic structure.

22. A method for thermal management of an electric propulsion (EP) system, the method comprising:
fabricating a magnetic circuit of the EP system as a monolithic structure;
based on the fabricating, forming a continuous serpentine channel inside of the monolithic structure, thereby obtaining an integrated continuous serpentine channel;
filling the integrated continuous serpentine channel with a working fluid;

sealing the integrated continuous serpentine channel, thereby embedding an oscillating heat pipe (OHP) in the magnetic circuit;

forming a discharge chamber of the EP system within an annular region provided by the monolithic structure of the magnetic circuit, the magnetic circuit configured to generate a radial magnetic field inside of the discharge chamber; and based on the embedding of the OHP, thermally managing the EP system by increasing a thermal conductivity of the magnetic circuit.

23. The method according to claim 22, wherein:
the fabricating of the magnetic circuit includes fabricating based on additive manufacturing.

* * * * *